Nov. 13, 1928.
W. E. TWICHELL ET AL
1,691,171
DISPENSING DEVICE
Filed May 13, 1925
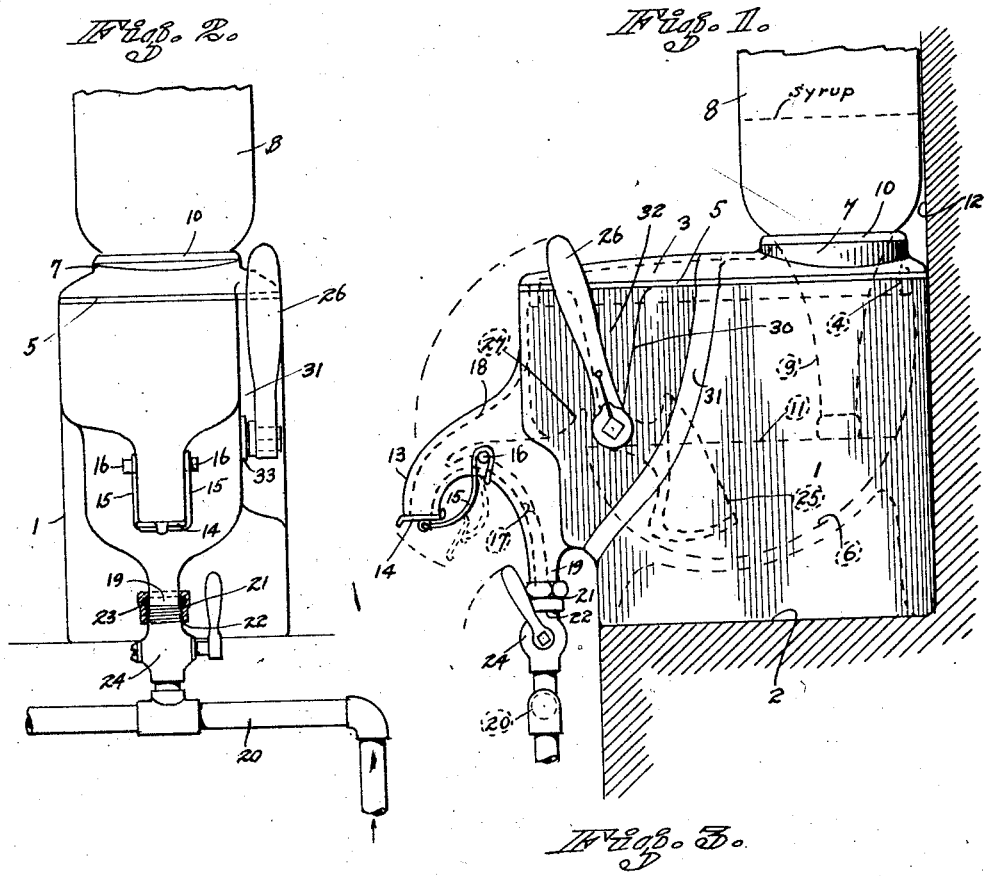
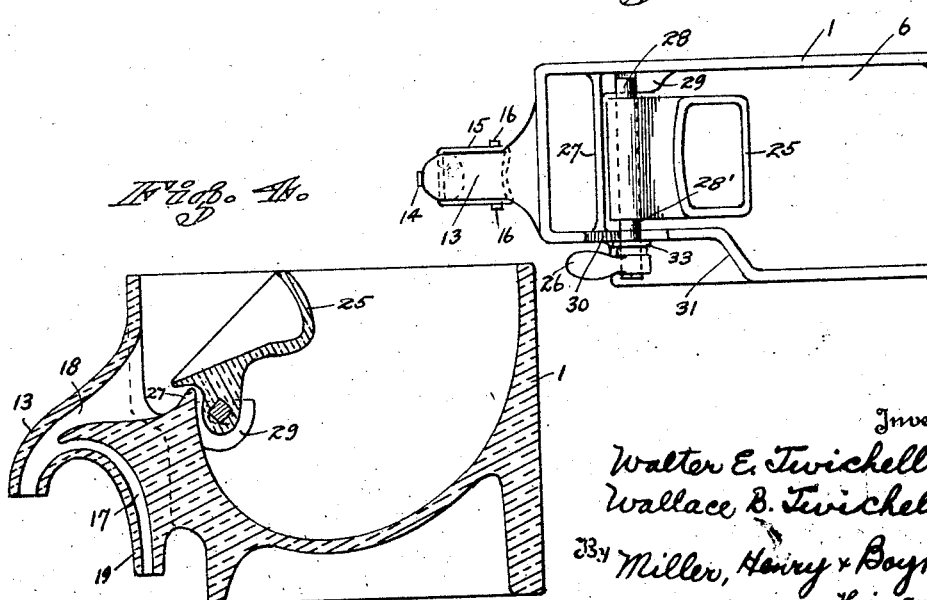
Inventors
Walter E. Twichell and
Wallace B. Twichell
By Miller, Henry & Boyken
their Attorneys.

Patented Nov. 13, 1928.

1,691,171

UNITED STATES PATENT OFFICE.

WALTER E. TWICHELL, OF SAN FRANCISCO, AND WALLACE B. TWICHELL, OF ST. HELENA, CALIFORNIA.

DISPENSING DEVICE.

Application filed May 13, 1925. Serial No. 29,924.

This invention relates to soda fountain apparatus and particularly to the combination faucets used to dispense a mixture of carbonated water and a fruit syrup.

The principal object of the invention is to provide apparatus of this kind which will be simple and effective while of absolutely sanitary construction so that the entire dispensing head may be quickly removed for thorough washing, like any common piece of table ware.

Another object is to provide such a dispensing faucet head which will form a unit for a given syrup flavor so that any number of units for any number of flavors desired may be arranged close to one another along a counter yet each be separately removable.

Another object is to provide such a device of a design particularly adapting it to be entirely formed of porcelain or glass.

Other objects will appear as the description proceeds:

The drawings hereto show one embodiment or the preferred form of our invention, Figure 1 being a side elevation of the complete device mounted upon a counter with the inner construction of the device indicated in dotted lines. Figure 2 a front elevation of Figure 1, Figure 3 a plan view of Figure 1 with lid removed, and Figure 4 a portion of Figure 1 in vertical section showing the syrup ladle in dumping position.

Specifically described, our invention comprises a porcelain bowl like receptacle 1 adapted to stand upon a counter or shelf 2 and having a porcelain lid 3 fitting snugly on the top of the receptacle. This lid may have a ground joint to effectively prevent the entrance of small insects such as ants or it may have an inwardly extending lip 4 and a rubber gasket 5 surrounding the lip to form a tight joint.

Within the receptacle the walls meet the bottom in gentle curves as at 6 so as to form a rounding bowl easily cleansed and at a point toward the rear of the bowl like interior the lid has a circular opening surrounded by a lip 7 adapted to support an inverted bottle 8 with its neck 9 extending downwardly into the bowl.

Between the bottle and lip is a rubber gasket ring 10 to form an insect tight joint at this point.

In use a bottle of flavoring syrup is quickly inverted through the opening in the lid and its contents maintain a level of the syrup within the bowl to the line 11 and at which point the rising level of the syrup closes off the mouth of the supply bottle and the flow ceases.

It should be noted from the showing of Figure 1 that the bottle when in inverted position on the lid falls forward of the vertical line 12 of the wall or counter against which the rear end of receptacle 1 is abutted, and this makes it easy to align a row of the receptacles on a common shelf without the bottles interfering.

The forward end of the receptacle projects slightly beyond the forward edge of shelf 2 and is provided with a spout 13 preferably formed of porcelain or glass integrally with the body of the receptacle.

The spout is directed downwardly and preferably has a spring closure lid 14 resiliently held against its lower end by a wire spring 15 suitably coiled about a pair of small projections 16 extending from the sides of the spout.

This lid 14 is adapted for pushing backwards out of the way, by a glass in the hand of an operator, to the dotted line position shown in Figure 1 and will of course immediately return to close the end of the spout upon the glass being withdrawn.

Communicating with the interior of the spout is a carbonated water passage 17 with its upper end directed in line with the spout so as to function like an aspirator when carbonated water is turned on and thereby draw along with it any liquid which may be within the main spout passage 18.

The lower end of the water passage 17 is extended downwardly through a porcelain neck 19 for coupling to the carbonated water pressure pipe 20. A suitable coupling of the porcelain neck 19 and the pipe line is indicated by the collar 21 (shown in section in Figure 2) screwing over the end 22 of a pipe or valve and compressing a soft rubber gasket ring 23 against both the neck 19 and the upper end of the fitting, the arrangement being such that the collar 21 may be easily tightened or loosened by the fingers of one hand to permit of quick uncoupling of the porcelain receptacle or dispensing head so that it is free for lifting from the shelf for washing out the bowl and passages.

A valve 24 on the carbonated water pipe leading to each receptacle unit serves for turning on and off the water, and to deliver a portion of syrup to the spout for mixing with the water we provide a dipper or ladle 25 which is pivoted to normally fall into the syrup for filling as indicated in Figure 1, and which may by a downward turn of the handle 26 be lifted from the syrup to the position shown in Figure 4 and emptied into a gutter 27 from whence it flows freely down the spout passage 18 to be caught by the carbonated water, also turned on, and thoroughly mixed therewith on its way to the glass.

The ladle 25 may be variously constructed but in order to carry out our idea of a completely sanitary device we prefer to make it of glass or porcelain with its pivot formed integral so that no possible opening for contamination will exist, and to this end we form on the ladle a pair of trunnions 28—28′ the former being revolvably supported on a grooved lug 29 on the inner left wall of the receptacle 1, and the latter projecting through a vertical slot 30 in the right hand side wall of the receptacle and resting on the bottom of the slot properly curved to serve as a bearing. The extreme end of the trunnion 28′ is squared as indicated or otherwise arranged to receive the handle 26 here indicated as of hard wood with an opening adapted to resiliently grip the squared end of the trunnion so that it may be quickly removed without loosening any screws or pins.

Adjacent the handle the side wall of the receptacle, and the side of the lid as well, are offset as at 31 so that the handle will be free to operate even when a row of the receptacles are arranged close together and all connected for operation by their individual carbonated water inlets indicated in Figure 2 of the drawing.

To close the slot 30 in the side wall of the receptacle we provide an elongated extension 32 from the right hand edge of the lid which fits in the slot and terminates in a curve acting as the upper half of the bearing for the trunnion 28′ and a rubber washer 33 placed between the handle and the outside of the receptacle effectually seals this point against entrance of foreign matter.

It is of course obvious without further drawings that the right hand trunnion, or both may be separable from the ladle so as to avoid the necessity of the slot 30 but we prefer to make the ladle and trunnion integral for the reason stated.

In operation sufficient air gains access to the receptacle through the spout each time it is opened to permit the inverted bottle reservoir to function properly.

In contemplating our invention as set forth it will be seen to be of a design especially adapted to manufacture out of porcelain or glass and consists of but three main pieces—receptacle, lid and ladle, and that it is everywhere rounded within for easy cleaning, and while we prefer to make it of porcelain, it is evident that it may also be made of glass or metal, or the receptacle built up instead of being made of one main unit and any such modifications falling within the scope of the invention are intended to be covered in the appended claims.

We claim:

1. A dispensing device of the character described comprising a receptacle provided with a spout projecting from one side, a tiltable ladle within the receptacle arranged for ladling liquid from the receptacle for ejection from the spout, said ladle being mounted on trunnions, one resting on a bearing formed within the receptacle, and the other extending through an opening in the side wall of the receptacle and provided with a handle lying adjacent said wall.

2. In a device of the character described, a receptacle having a spout, means for ejecting syrup from the receptacle through the spout, and means for washing out the spout with water, a closure on the spout arranged to be washed under the stream of water and for automatically closing the same after washing.

WALTER E. TWICHELL.
WALLACE B. TWICHELL.